US006738712B1

United States Patent
Hildebrant

(10) Patent No.: US 6,738,712 B1
(45) Date of Patent: *May 18, 2004

(54) ELECTRONIC LOCATION SYSTEM

(75) Inventor: David M Hildebrant, Castlerock, CO (US)

(73) Assignee: MindFunnel.com, Inc., Castle Rock, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/106,573

(22) Filed: Mar. 25, 2002

(65) Prior Publication Data (65)

Related U.S. Application Data

(63) Continuation-in-part of application No. 09/596,301, filed on Jun. 17, 2000, now Pat. No. 6,363,324.

(51) Int. Cl.[7] .......................... B60Q 1/48; G01C 21/00; H04B 7/185
(52) U.S. Cl. .................................... 701/213
(58) Field of Search ................. 701/36, 200, 206–209, 701/211, 213–216; 340/425.5, 426, 435, 436, 474, 825.06, 825.36, 825.49, 311.1, 313, 328–330, 815.4; 342/350–352, 357.01–357.09, 357.11–357.17, 450–451, 454–458, 462–465

(56) References Cited

U.S. PATENT DOCUMENTS

| 5,280,293 | A | | 1/1994 | Tong |
| 5,289,163 | A | | 2/1994 | Perez et al. |
| 5,594,425 | A | | 1/1997 | Ladner et al. |
| 5,612,688 | A | | 3/1997 | Masudaya |
| 5,883,594 | A | | 3/1999 | Lau |
| 6,172,640 | B1 | | 1/2001 | Durst et al. |
| 6,321,091 | B1 | * | 11/2001 | Holland .................... 455/414.2 |
| 6,363,324 | B1 | * | 3/2002 | Hildebrant .................. 701/213 |
| 6,396,403 | B1 | * | 5/2002 | Haner ..................... 340/573.4 |

* cited by examiner

Primary Examiner—Thu V. Nguyen
(74) Attorney, Agent, or Firm—Holland & Hart

(57) ABSTRACT

A vehicle locating system that includes a hand-held remote unit associated with a user and a locator unit associated with a vehicle. The locator unit utilizes a GPS to store a location of the vehicle. The remote unit is selected from the group laptop computer, key ring, GPS watch, cellular telephone and PDA, and it utilizes a GPS to store a location of the user. The remote unit queries the locator unit to obtain the location of the vehicle, and then compares the location of the vehicle to its own location, whereupon the remote unit displays a direction for the user to travel in order to reach the vehicle.

8 Claims, 12 Drawing Sheets

ELECTRONIC LOCATION SYSTEM

REFERENCE TO RELATED APPLICATIONS

This application is a continuation in part application of U.S. patent application Ser. No. 09/596,301 filed on Jun. 17, 2000, now U.S. Pat. No. 6,363,324 B1.

BACKGROUND OF THE INVENTION

1. Field of the Invention

The present invention relates generally to location systems and, more specifically, to a system utilizing the global positioning satellite network to locate a vehicle when left in a parking lot or other crowded area.

2. Description of the Related Art

Numerous types of location systems have been provided in the prior art. For example, U.S. Pat. Nos. 5,280,293; 5,289,163; 5,594,425 and 5,612,688 all are illustrative of such prior art. While these units may be suitable for the particular purpose to which they address, they would not be as suitable for the purposes of the present invention as heretofore described.

A mobile direction finder for tracking a remote transmitter computes the transmitter direction relative to the direction finder and time-averages with reference to a datum derived from a predetermined orientation independent of the direction finder orientation.

U.S. Pat. No. 5,289,163

Inventor: Carla D. Perez et al.

Issued: Feb. 22, 1994

A child position monitoring device monitors the position of a child by detecting the signal strength of a radio frequency carrier from a transmitter attached to the child. If the signal of the radio frequency carrier is too weak, the child is too far away from the adult who has the child positioning monitoring device. When this happens, the adult is informed that the child has wandered too far away through the use on an audio tone or through the use of vibrations coming from the device. Once the adult is notified that the child is too far away, the device also has a locating display for indicating the relative direction of the child with respect for the adult. The display uses eight LED's arranged around an emblem used to represent the position of the adult. The LED which lights up indicates the relative direction of the child.

A locator apparatus includes a receiver for receiving location information indicative of a location of the receiver. A memory is coupled to the receiver and stores the location information. A cellular transmitter is coupled to the memory and the receiver and transmits the location information to a second receiver. A data processing station processes the location information to determine the location of the receiver.

An apparatus for searching for a sensed object which is capable of immediately finding the direction in which a movable sensed object is present, from the contents displayed on an operation unit at hand. The searching apparatus includes a portable operation unit, an absolute direction sensor contained in the operation unit and generating an absolute direction sensor contained in the operation unit and generating an absolute direction signal which indicates an absolute direction, a removal sensor for automatically sensing a removal of the operation unit from the sensed object, a displacement sensor for sensing the state of displacement of the operation unit to generate displacement information, a controller generating direction indicating information which indicates the direction in which the sensed object is present, based on the displacement information and the absolute direction signal, a display for displaying contents of the direction indicating information; and a manual operation element for controlling the contents displayed on the display through the controller.

SUMMARY OF THE PRESENT INVENTION

The present invention relates generally to location systems and, more specifically, to a system utilizing the global positioning satellite network to locate a vehicle when left in a parking lot or other crowded area.

A primary object of the present invention is to provide a vehicle locator system that will overcome the shortcomings of prior art devices.

Another object of the present invention is to provide a vehicle locator system which is able to alert a user as to the location of a vehicle by providing a direction and relative altitude of the vehicle.

A further object of the present invention is to provide a vehicle locator system which is able to utilize the Global Positioning Satellite System to obtain a location for the vehicle which, when compared to the location of the user holding a remote unit, provides a direction of travel for locating the vehicle.

A yet further object of the present invention is to provide a vehicle locator system wherein the vehicle is equipped with a transmitter and receiver able to communicate with the Global Positioning Satellite System to determine a location for the vehicle.

A still further object of the present invention is to provide a vehicle locator system including a remote unit able to utilize the Global Positioning Satellite System to determine a location for the remote unit and communicate with the transmitter in the vehicle to determine a position for the vehicle relative to the remote unit.

A further object of the present invention is to provide a vehicle locator system wherein the remote unit includes a plurality of indicator lights for indicating a direction in which the vehicle can be found.

A further object of the present invention is to provide a vehicle locator system wherein the remote unit includes an indicator light for indicating an altitude level relative to the altitude of the remote unit at which the vehicle can be found such as when the vehicle is located on a different story of a parking lot from the user.

A yet further object of the present invention is to provide a vehicle locator system wherein the vehicle locator unit having an assigned unique identity can be wirelessly queried to transmit the stored longitude, latitude and altitude information of the vehicle locator unit.

A Still yet further object of the present invention is to provide a vehicle locator system wherein the vehicle locator unit having an assigned unique identity can be wirelessly queried to transmit longitude, latitude and altitude information using radio frequency (506 KHz–300 GHz).

Another object of the present invention is to provide a vehicle locator system wherein the vehicle locator unit having an assigned unique identity can be wirelessly queried using cellular radio systems, Doppler RF, RF Radio Waves, Radio Frequency Identification (RFID) and Satellite Radio.

Yet another object of the present invention is to provide a vehicle locator system wherein the vehicle locator unit can respond with the locator unit Latitude, Longitude and altitude to an interrogation request from a Radio Frequency Identification (RFID) interrogator.

Still yet, another object of the present invention is to provide a vehicle locator system wherein the vehicle locator unit having an assigned unique identity can be wirelessly queried using cellular radio systems using Time Division Multiple Access (TDMA) and/or Code Division Multiple Access (CDMA) and/or Frequency Division Multiple Access (FDMA) to transmit its stored longitude, latitude and altitude information to a Wireless Service Provider (WSP).

A further object of the present invention is to provide a vehicle locator system wherein the vehicle locator unit assigned a unique identity can use the Advances Mobile Phone Service (AMPS-[US]) and/or, Nordic Mobile Telephone (NMT [Scandinavia]) and/or, Total Access Communications System (TACS [UK]) and/or Global System for Mobile Communications (GSM [Europe, Asia]) to be wirelessly queried using the aforementioned cellular radio systems using Time Division Multiple Access (TDMA) and/or Code Division Multiple Access (CDMA) and/or Frequency Division Multiple Access (FDMA) to transmit its stored longitude, latitude and altitude information to a Wireless Service Provider (WSP).

A yet further object of the present invention is to provide a vehicle locator system wherein the remote unit can initiate a wireless query to the vehicle locator unit to transmit longitude, latitude and altitude information.

A Still yet further object of the present invention is to provide a vehicle locator system having a remote unit using radio frequency (500 KHz–300 GHz) to initiate a communication with the vehicle locator unit to transmit the stored longitude, latitude and altitude information Another object of the present invention is to provide a vehicle locator system having a remote unit using plain old telephone system (POTS), and/or cellular radio systems, and/or Doppler RF, and/or RF Radio Waves, and/or Radio Frequency Identification (RFID) and/or Satellite Radio to initiate the transmission of the stored vehicle locator unit latitude, longitude and altitude information.

Yet another object of the present invention is to provide a vehicle locator system having a remote unit using Radio Frequency Identification (RFID) to initiate the transmission of the stored vehicle locator unit latitude, longitude and altitude information.

Still yet another object of the present invention is to provide a vehicle locator system having a remote unit using the Public Switched Telephone Network System (PSTN) or cellular radio systems using Time Division Multiple Access (TDMA) and/or Code Division Multiple Access (CDMA) and/or Frequency Division Multiple Access (FDMA) to initiate the transmission of the stored vehicle locator unit latitude, longitude and altitude information.

A further object of the present invention is to provide a vehicle locator system having a remote unit using the Advances Mobile Phone Service (AMPS -[US]) and/or, Nordic Mobile Telephone (NMT [Scandinavia]) and/or, Total Access Communications System (TACS [UK]) and/or Global System for Mobile Communications (GSM [Europe, Asia]) to initiate the transmission through a Wireless Service Provider (WSP) of the stored vehicle locator unit latitude, longitude and altitude information.

A yet further object of the present-invention is to provide a vehicle locator system having a remote unit having a facial visual direction system comprising a visual altitude indicator and a plurality of visual direction indicators.

A still yet further object of the present invention is to provide a vehicle locator system having a remote unit having the aforementioned visual direction system that can be incorporated into the face of an electronic device having a display unit.

Another object of the present invention is to provide a vehicle locator system having a remote unit having the aforementioned visual direction system that can be incorporated into a cellular phones, Palm Pilots, PDA's, laptop computers or other mobile communication devices.

Yet another object of the present invention is to provide a vehicle locator system having a remote unit having the aforementioned visual direction system that can be incorporated into a personal computer.

Another object of the present invention is to provide a vehicle locator system that is simple and easy to use.

A still further object of the present invention is to provide a vehicle locator system that is economical in cost to manufacture.

Additional objects of the present invention will appear as the description proceeds.

A system for locating a vehicle using the Global Positioning Satellite System (GPS). The system includes a locator unit and a remote unit. The locator unit is connected to the vehicle and includes a processor; a transmitter for obtaining a location from the GPS indicating the location of the vehicle; and a receiver for receiving the location signal from the GPS for storage in the processor. The remote unit includes a processor; a transmitter for obtaining a location from the GPS indicating the location of the remote unit; and a receiver for receiving the position signal from the GPS for storage in the processor. A device, connected to the processor, generates a request signal requesting the location of the locator unit; and a signal device relays a relative position of the locator unit to a user. Upon activation of the generating device the transmitter transmits the request signal to the locator unit. The locator unit retrieves and transmits the location signal to the remote unit in response thereto. Upon receipt of the location signal the processor of the remote unit compares the location signal to the position signal to determine a relative position of the locator unit with respect to the remote unit. The processor then controls the signal device to indicate the relative position of the locator unit. The signal device provides both an audible and visual indication to the user as to the longitude, latitude and altitude of the locator unit.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

Figure 4:
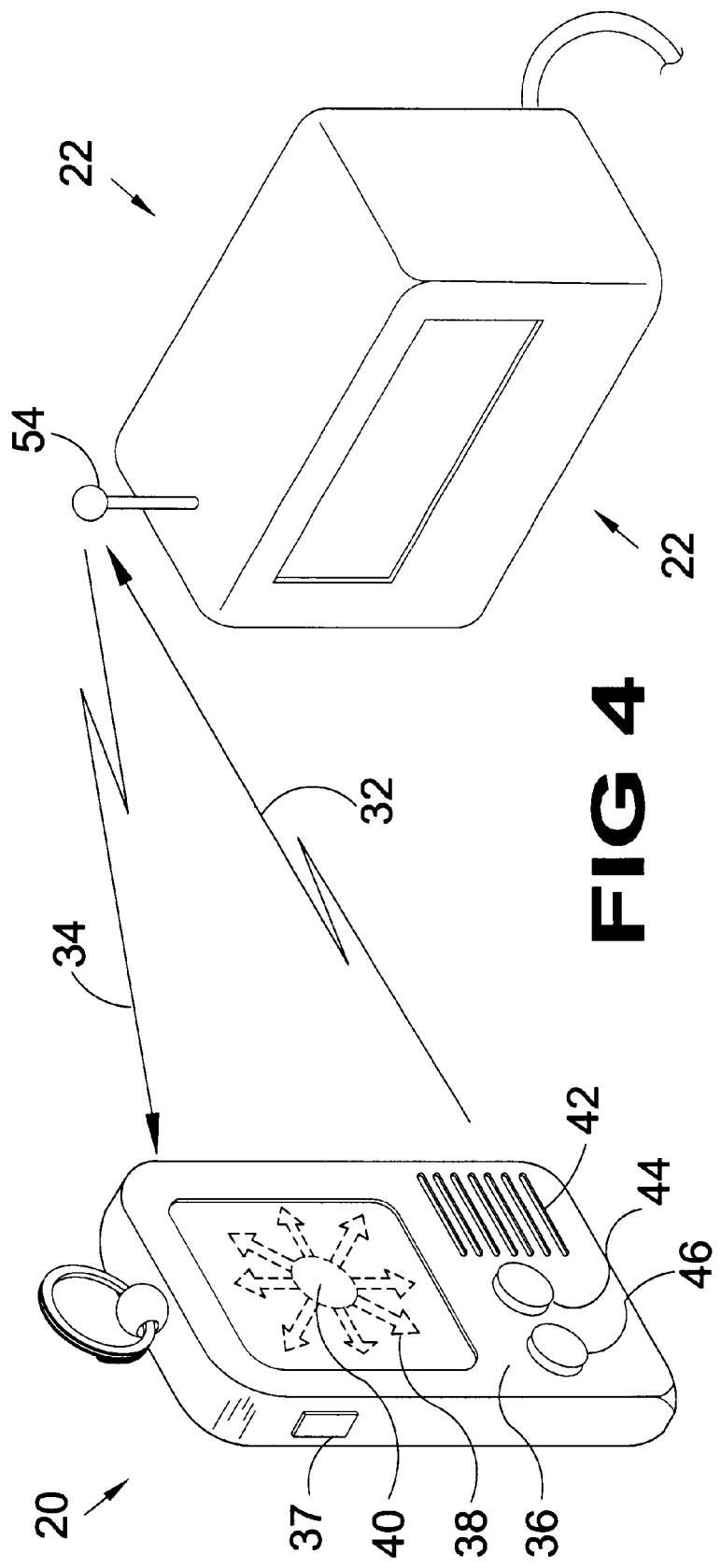
Figure 5:
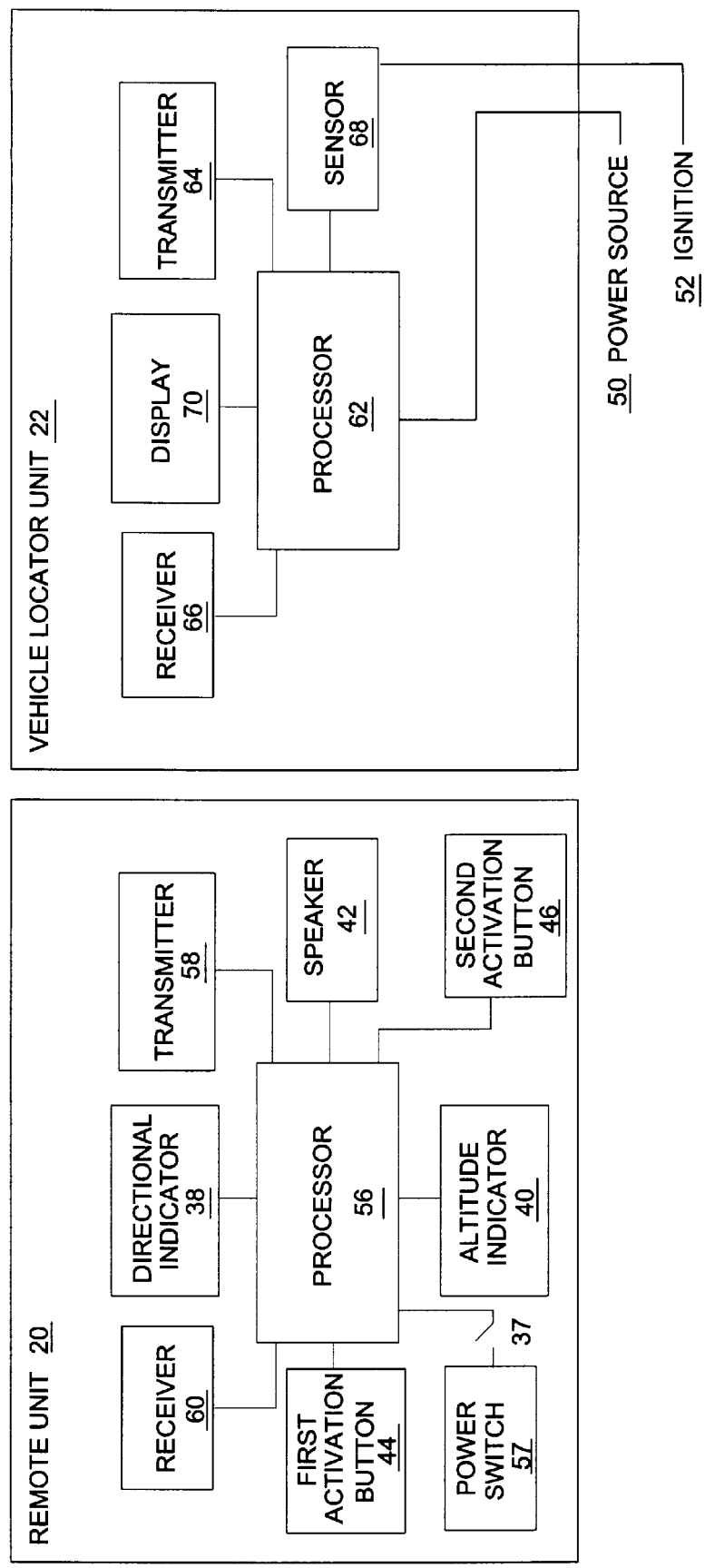
Figure 6:
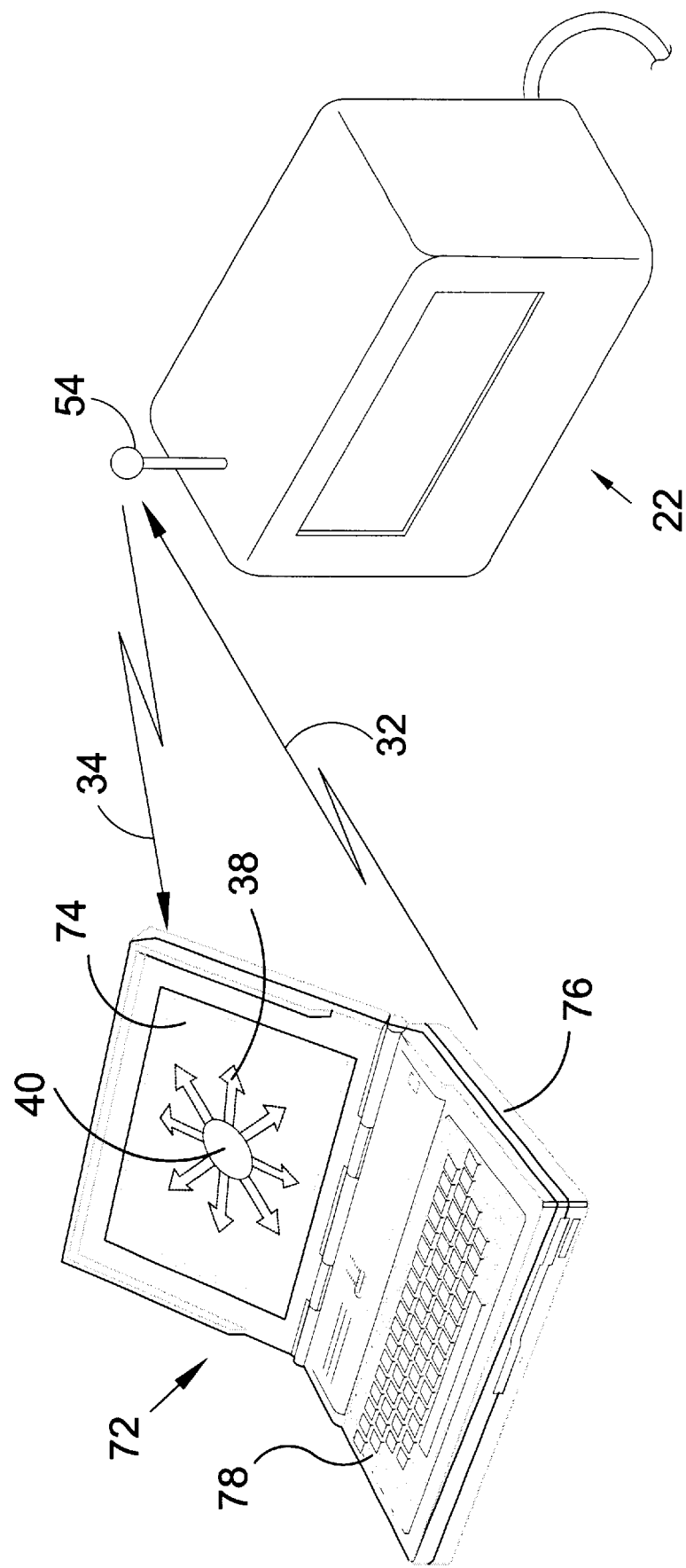
Figure 7:
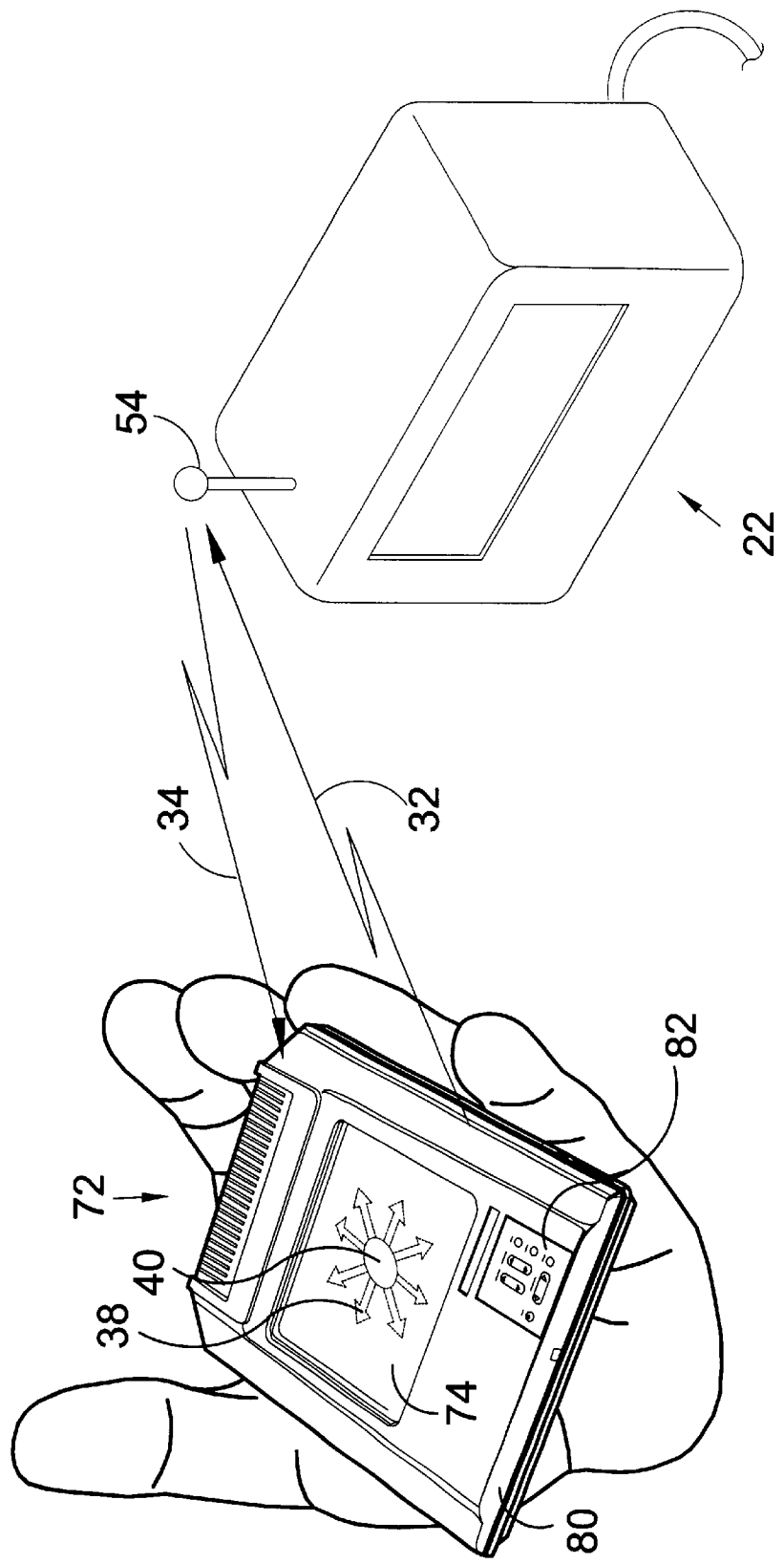
Figure 8:
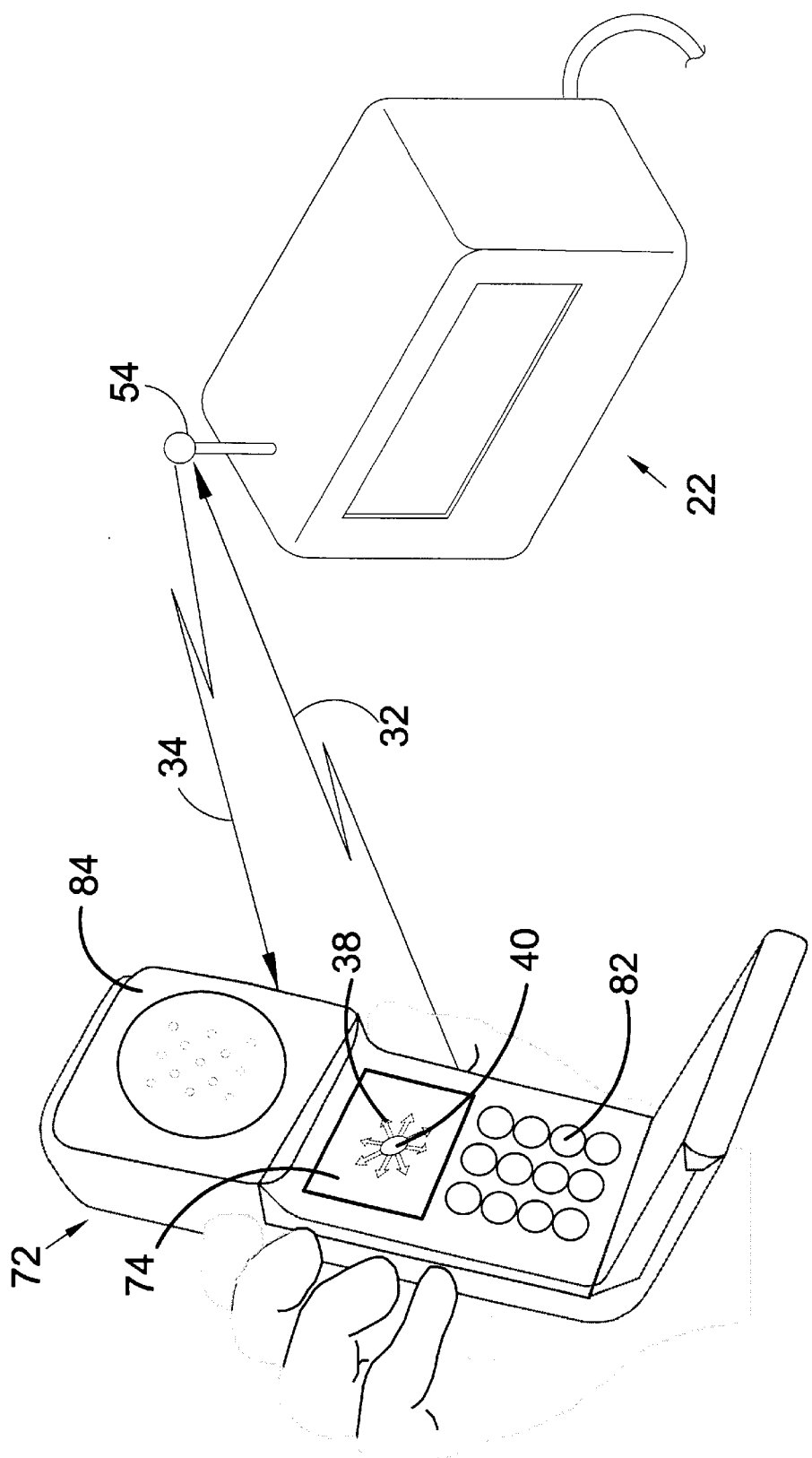
Figure 9:
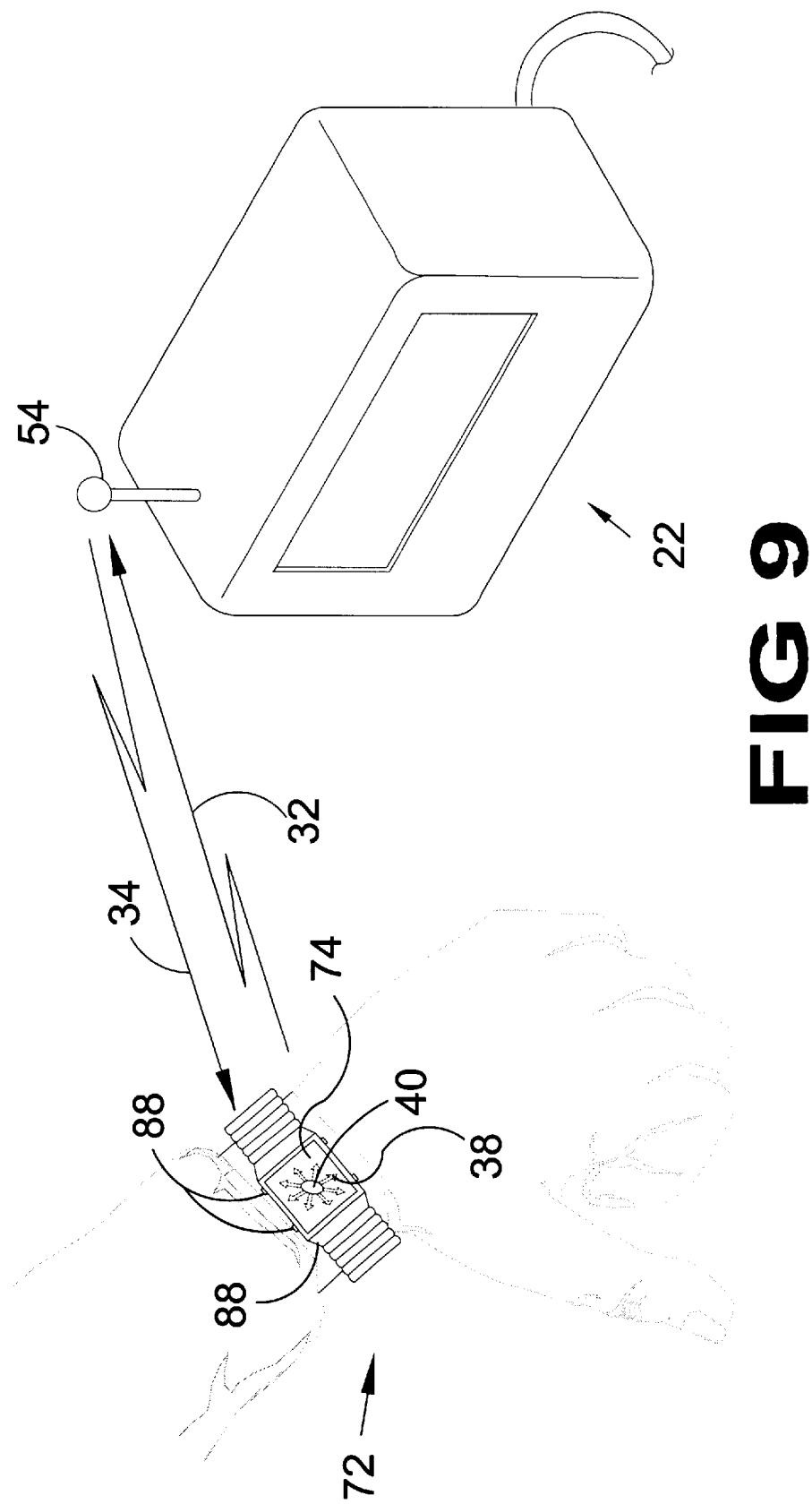
Figure 10:
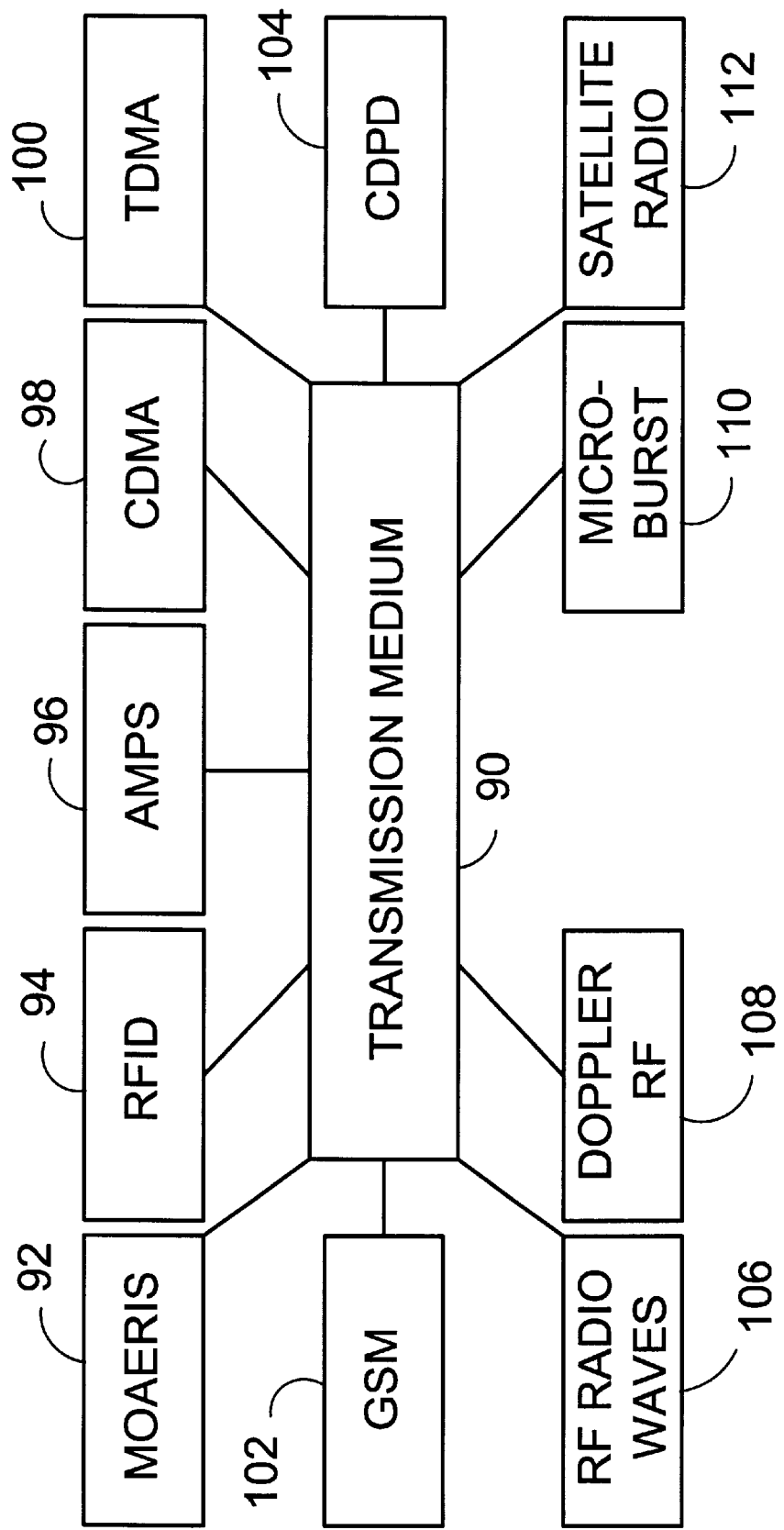
Figure 11:
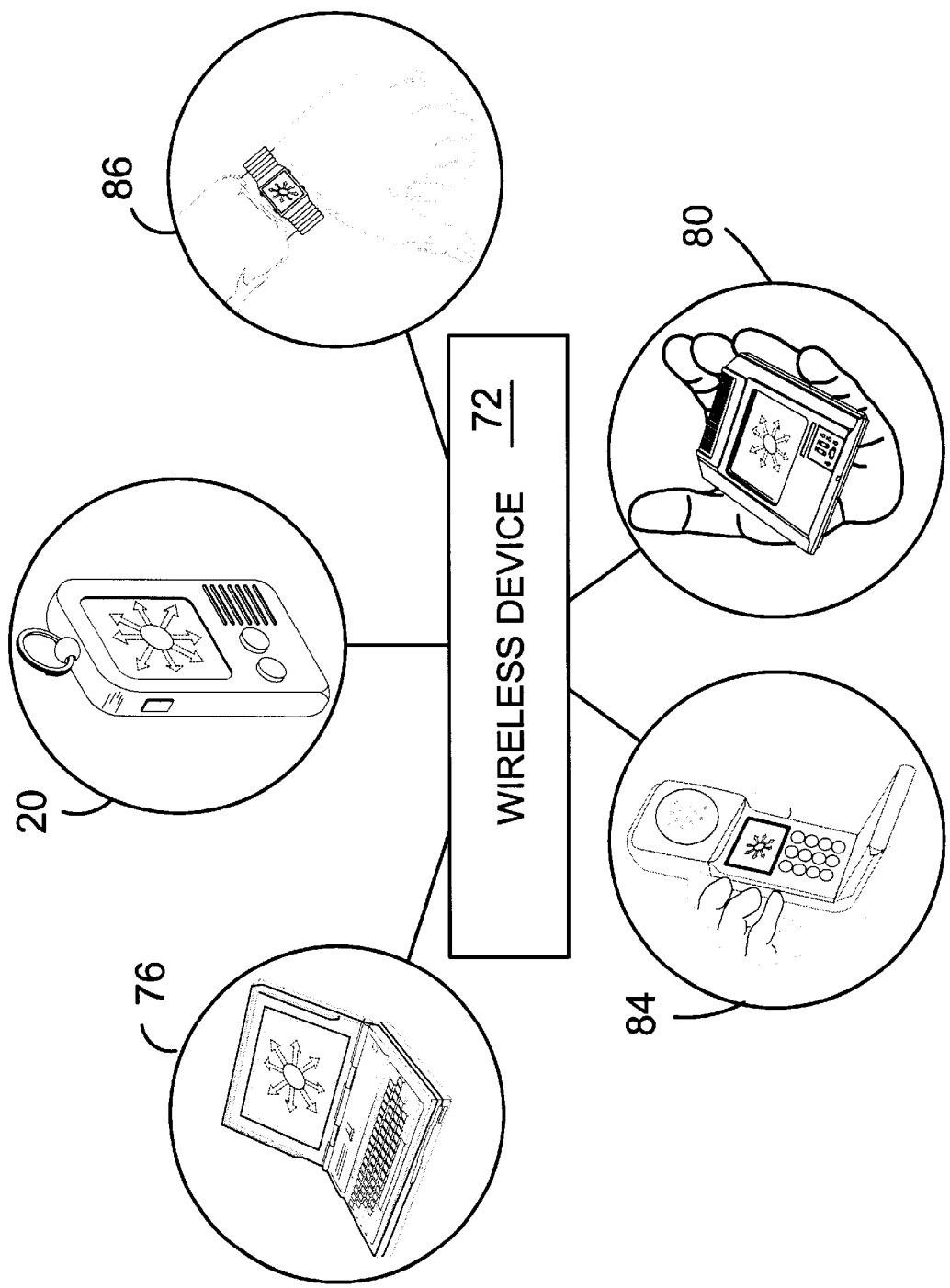
Figure 12:
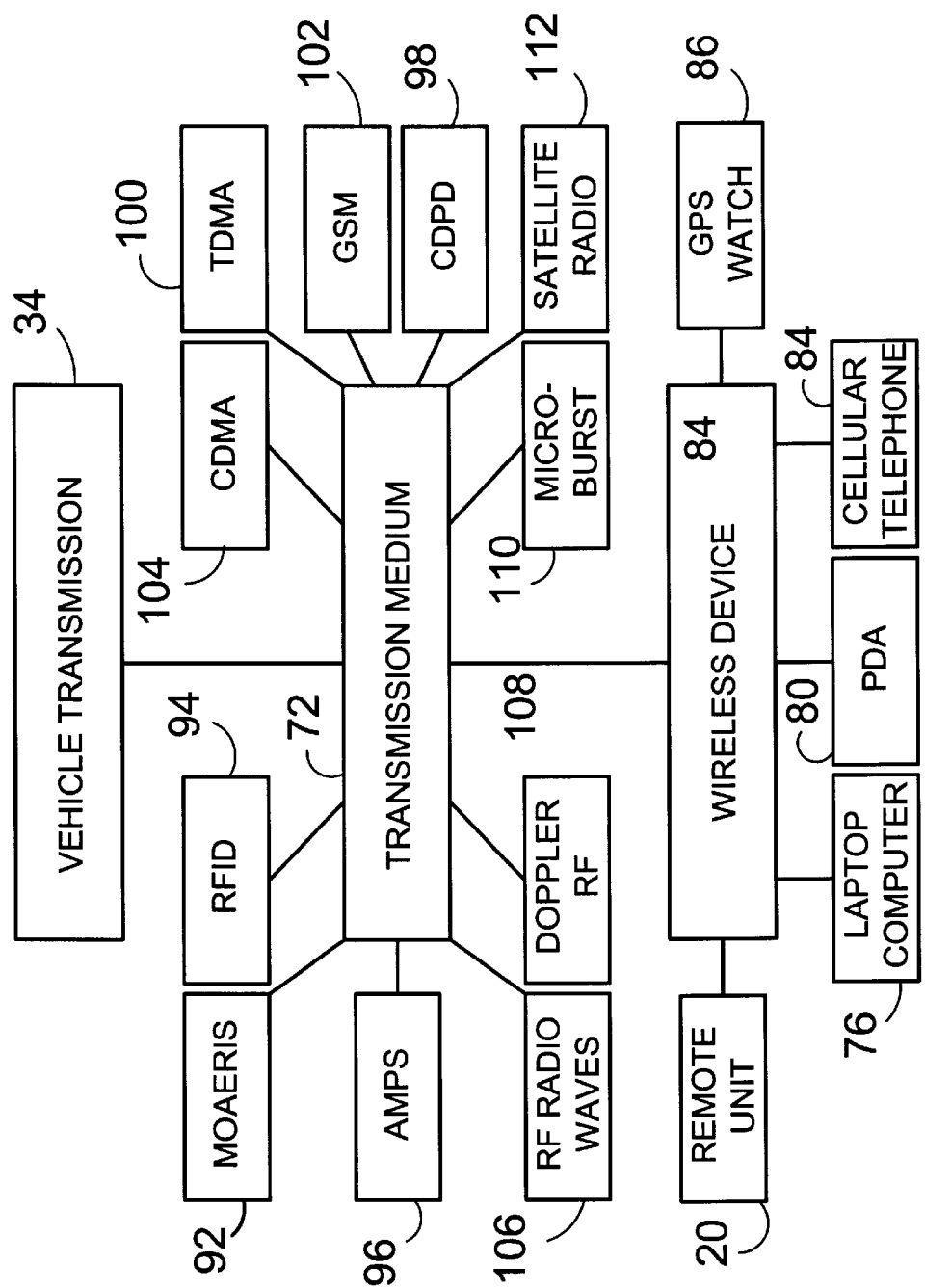

FIG. 4 is an enlarged perspective view of the remote unit and locator unit of the vehicle locator system of the present invention; and FIG. 5 is a block diagram of the vehicle locator system of the present invention; and FIG. 6 is an enlarged perspective view of an another alternate remote unit and locator unit of the vehicle locator system of the present invention; and FIG. 7 is an enlarged perspective view of an another alternate remote unit and locator unit of the vehicle locator system of the present invention; and FIG. 8 is an enlarged perspective view of an another alternate remote unit and locator unit of the vehicle locator system of the present invention; and FIG. 9 is a enlarged perspective view of an another alternate remote unit and locator unit of the vehicle locator system of the present invention; and FIG. 10 its a block diagram of the vehicle locator system of the present invention; and FIG. 11 is an enlarged perspective view of alternate remote units of the vehicle locator system of the present invention; and FIG. 12 is a block diagram of the transmission methods of the vehicle locator system of the present invention and alternate remote devices.

DESCRIPTION OF THE REFERENCED NUMERALS

Turning now descriptively to the drawings, in which similar reference characters denote similar elements throughout the several views, the Figures illustrate the vehicle locator system of the present invention. With regard to the reference numerals used, the following numbering is used throughout the various drawing figures.

10 vehicle locator system of the present invention
12 user attempting to locate a vehicle using vehicle locator system
13 vehicle desired to be located
14 parking lot in which vehicle is located
16 Global Positioning Satellite
18 vehicles in parking lot
20 remote unit of vehicle locator system
22 vehicle locator unit of vehicle locator system
24 arrow indicating request signal from remote unit to the GPS satellite
26 arrow indicating position signal of remote unit from GPS satellite
28 arrow indicating request signal from locator unit to the GPS satellite
30 arrow indicating position signal of locator unit from GPS satellite
32 arrow indicating location signal from remote unit to locator unit
34 arrow indicating location response signal from locator unit to the remote unit
36 front side of remote unit
37 power switch
38 visual direction indicator
40 visual altitude indicator
42 speaker
44 first button
46 second button
48 hood of vehicle
50 vehicle battery
52 vehicle ignition system
54 antenna of locator unit
56 processor of remote unit
57 power source of remote unit
58 transmitter of remote unit
60 receiver of remote unit
62 processor of locator unit
64 transmitter of locator unit
66 receiver of locator unit
68 sensor of locator unit
70 display of locator unit
72 wireless device
74 display of remote unit
76 laptop computer
78 keyboard
80 PDA
82 keypad
84 cellular phone
86 watch
88 signal initiator
90 transmission protocol
92 moaeris
94 radio frequency identification
96 advance mobile phone service
98 code division multiple access
100 time division multiple access
102 global system for mobile communications
104 code division multiple access
106 Radio frequency radio waves
108 doppler radio frequency
110 microburst access system
112 satellite radio

DETAILED DESCRIPTION OF THE PREFERRED EMBODIMENT

Turning now descriptively to the drawings, in which similar reference characters denote similar elements throughout the several views, FIGS. 1 through 5 illustrate the vehicle locator system of the present invention indicated generally by the numeral 10.

Figure 1:
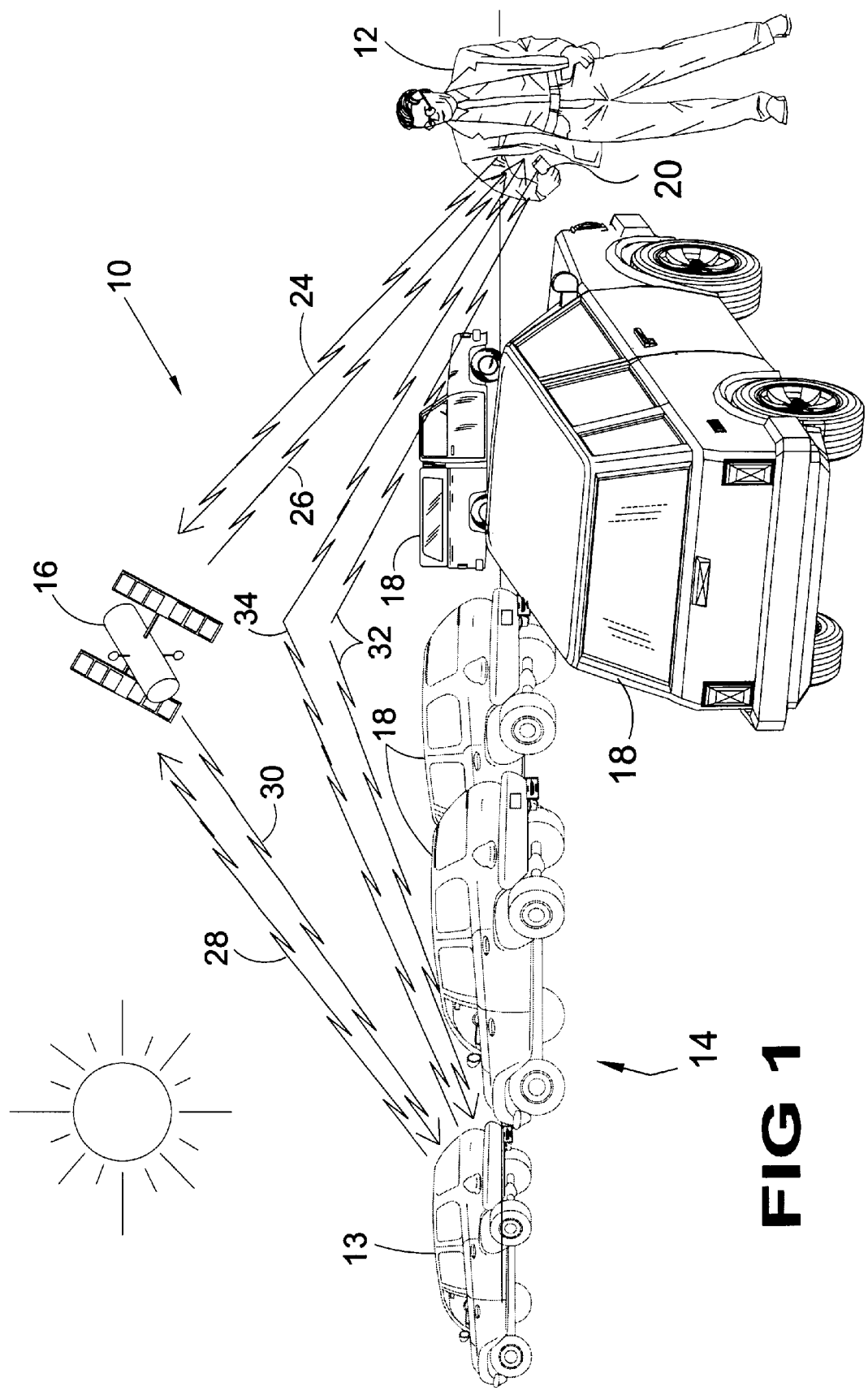
FIG. 1 is a top perspective view of a parking lot in which a user is attempting to locate a vehicle using the vehicle locator system of the present invention.

The vehicle locator system 10 is illustrated in FIG. 1 for use by a person 12 to locate a particular vehicle 13 within a parking lot 14. This figure illustrates the parking lot 14 including a plurality of vehicles 18 parked therein. When parking a vehicle in such a parking lot 14 it is easy to forget where the vehicle was parked. When the parking lot is full, the person 12 who parked the vehicle 13 will have a very difficult time locating the vehicle 13 if the location of the vehicle is forgotten. The vehicle locator system 10 of the present invention utilizes the Global Positioning Satellite Network, illustrated by the satellite 16 orbiting the earth for aiding the person 12 in determining the location of the vehicle 13.

Figure 3:
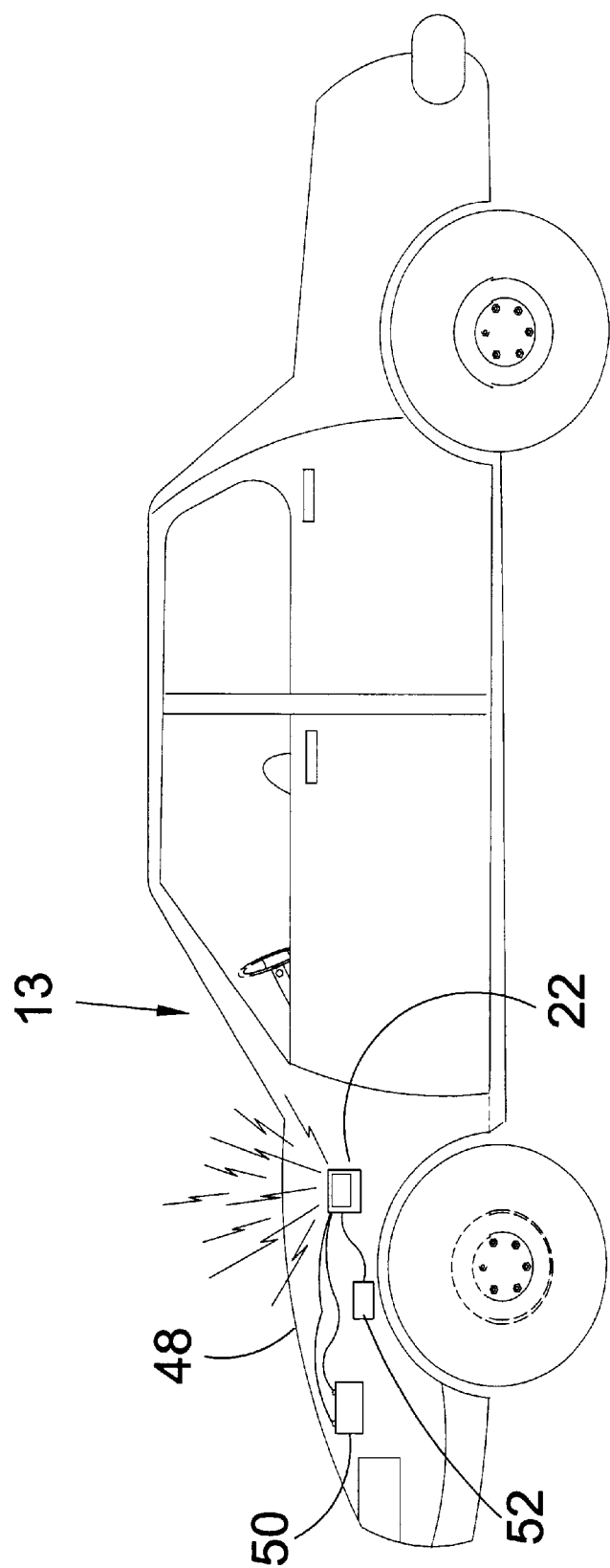
FIG. 3 is an enlarged top perspective view of the locator unit positioned within the vehicle of the vehicle system of the present invention.

The vehicle locator system 10 includes a remote unit 20 and a vehicle locator unit 22, see FIGS. 3–5 for an illustration and description of the vehicle locator unit 22. The remote unit 20 is retained by the user 12 and can be in the form of a key ring or other unobtrusive form which is not burdensome to the user 12. The vehicle locator unit 22 is positioned within the vehicle 13.

The remote unit 20 communicates with the GPS satellite 16 when activated to determine a location thereof in terms of longitude, latitude and altitude. Upon activation of a location key, the remote unit 20 transmits a request signal to the GPS satellite 16 as indicated by the arrow labeled with the numeral 24. The GPS satellite 16 receives this signal 24 and determines the longitude, latitude and altitude of the remote unit 20. The GPS satellite 16 then transmits a signal indicative of the determined longitude, latitude and altitude of the remote unit 20 to the remote unit 20 as indicated by the arrow labeled with the numeral 26.

The locator unit 22 also communicates with the GPS satellite 16 to determine a location thereof in terms of longitude, latitude and altitude. When the vehicle 13 ceases movement and the ignition is switched off, the locator unit 22 preferably automatically transmits a request signal to the GPS satellite 16 as indicated by the arrow labeled with the numeral 28. The GPS satellite 16 receives this signal 24 and determines the longitude, latitude and altitude of the locator unit 22. The GPS satellite 16 then transmits a signal indicative of the longitude, latitude and altitude of the locator unit 22 to the locator unit 22 as indicated by the arrow labeled with the numeral 30. The longitude, latitude and altitude signal received by the locator unit 22 is stored therein.

The remote unit 20 also communicates directly with the locator unit 22. When a locate button on the remote unit 20 is activated, the remote unit 20 sends a location signal as indicated by the arrow labeled with the numeral 32 to the locator unit 22 requesting the location of the locator unit 22 in terms of longitude, latitude and altitude. In response to receipt of this signal 32, the locator unit 22 retrieves the location information from memory and transmits a location response signal including the retrieved information to the remote unit 20 as indicated by the arrow labeled with the numeral 34. The received location response signal 34 includes the longitude, latitude and altitude of the locator unit 22 and is compared with the longitude, latitude and altitude of the remote unit 20. Based upon this comparison, the remote unit 20 is able to determine the relative direction the user 12 must travel to locate the vehicle 13.

The locator unit 22 may alternatively or additionally request location information including the current longitude, latitude and altitude from the GPS satellite 16 upon receipt of the location request signal 32 from the remote unit 20. The locator unit 22 can thus also be used to determine an approximate direction and possibly a location of the vehicle 13 in the event the vehicle is stolen or in motion at the time of the request.

Figure 2:
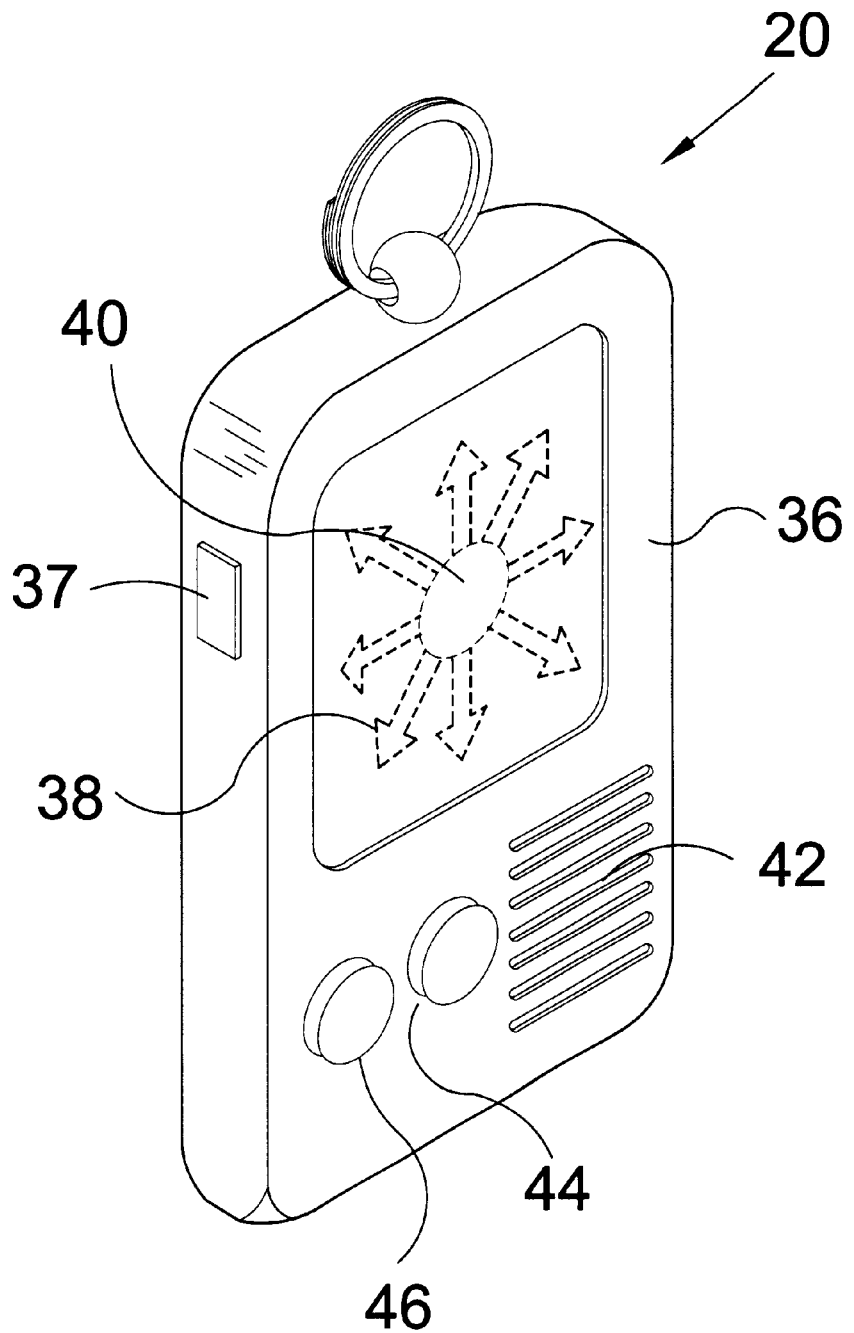
FIG. 2 is an enlarged top perspective view of the remote unit used with the vehicle locator system of the present invention.

A perspective view of the front side 36 of the remote unit 20 is shown in FIG. 2. The remote unit 20 is shown in the shape of a key ring. However the remote unit 20 may be provided in any shape desired. The shape of the remote unit 20 being preferred in a form which is unobtrusive to the user 12. As can be seen from this figure, the remote unit 20 includes a power switch 37 for turning the remote unit 20 on and off. The remote unit 20 also includes a visual direction indicator 38 and a visual altitude indicator 40. The visual direction indicator 38 includes a plurality of arrow indicators each pointing in a different direction. Upon determining a relative direction of travel to locate the vehicle 13, the visual direction indicator 38 illuminates an arrow indicating the determined direction. The visual altitude indicator 40 indicates whether the vehicle 24 is located at the same or a different altitude than the user 12. When the user 12 and the vehicle 24 are at the same altitude the visual indicator 40 will remain in an unilluminated state. When the vehicle 13 is located at a different altitude than the remote unit 20, the visual altitude indicator 40 will become illuminated. The color of illumination is indicative of the relative altitude of the vehicle, one color for a lower altitude than the remote unit 20 and a second color indicating a higher altitude.

An audio speaker 42 is also provided for generating an audible signal which is able to indicate the distance of the remote unit 20 from the vehicle 24. As the user approaches the position of the vehicle 13, the tone of the audible signal changes to indicate the proximity of the user 12 to the vehicle 13. A first button 44 is provided on the face side 36 for providing a location request signal to the GPS satellite 16. Activation of the first button 44 allows the remote unit 20 to obtain a longitude, latitude and altitude position used for determining the relative position of the vehicle therefrom. A second button 46 is provided to cause generation and transmission of a location request signal to the locator unit 22. In response to receipt of this signal the locator unit 22 will transmit a response signal to the remote unit 20 indicating the longitude, latitude and altitude of the vehicle 13. The remote unit 20 uses the response signal to determine the relative position of the vehicle 13 with respect to the remote unit 20. Once activated, the remote unit 20 may be controlled to continually transmit a location request signal from the GPS satellite 16 and from the locator unit 22 at periodic intervals to continually update the visual direction indicator 38, the visual altitude indicator 40 and adjust the audible signal to indicate proximity to the vehicle 13.

A perspective view of a vehicle 13 having the locator unit 22 installed therein is illustrated in FIG. 3. The locator unit 22 is installed in the vehicle 13, preferably under the hood 48. The locator unit 22 is preferably connected to the vehicle battery 50, receiving power therefrom and may also be connected to the ignition system 52 of the vehicle 13. The locator unit 22 is thus able to detect when the vehicle 13 has been turned off and is stationary. The locator unit 22 may be programmed to contact the GPS satellite 16 upon detecting the turning off of the ignition to receive a signal indicative of the longitude, latitude and altitude for its present position. This value is stored by the locator unit 22 and transmitted to the remote unit 20 upon receipt of the location request signal 32. Alternatively, the locator unit 22 may contact the GPS satellite 16 only upon receipt of the request signal 32 from the remote unit 20 or at both when the request signal 32 is received and upon detecting the ignition has been turned off. By controlling the locator unit 22 to communicate with the GPS satellite 16 upon receipt of the request signal 32, a determination of a direction to travel to find the vehicle 13 can be obtained if the vehicle 13 was stolen and is currently moving.

An enlarged perspective view of the remote unit 20 and locator unit 22 showing communication therebetween is illustrated in FIG. 4. This view shows the remote unit 20 and the locator unit 22 communicating via the location request signal 32 and the location response signal 34. Upon activation of the first button 42, the remote unit 20 generates and transmits the location request signal 32. The locator unit 22 receives the location request signal 32 through a receiver antenna 54 and in response thereto generates the location response signal 34. The location response signal 34 is generated based upon a longitude, latitude and altitude signal received from the GPS satellite 16. The location response signal 34 is transmitted back to the remote unit 20. The remote unit 20 compares the location response signal 34 with a position signal indicating the longitude, latitude and altitude of the remote unit 20 received from the GPS satellite 16 to determine the relative position and distance of the vehicle 13 from the remote unit 20. Upon determining the position and distance of the vehicle 13 from the remote unit 20, the remote unit 20 illuminates the appropriate arrow of the visual direction indicator 38 to point in the direction of the vehicle from the current location of the remote unit 20 as well as the visual altitude indicator 40 to alert the user 12 as to the altitude of the vehicle 13. Should the remote unit 20 determine that the vehicle 13 is at a different altitude than the remote unit 20, the remote unit illuminates the visual altitude indicator 40 to indicate the difference in altitude. The color of illumination of the visual altitude indicator 40 is dependent upon whether the vehicle 13 is at a higher or lower altitude. The remote unit 20 also activates the speaker 42 to generate an audible signal indicative of the distance of the vehicle 13 from the remote unit 20. As the user 12 approaches the vehicle 13 with the remote unit 20, the audible signal changes to indicate the proximity to the vehicle 13.

A block diagram illustrating the components of the remote unit 20 and locator unit 22 is provided in FIG. 5. As can be seen from this figure, the remote unit 20 includes a processor 56 for controlling operation of the remote unit 20. The processor 56 is connected to a power source 57 via the power switch 37. Activation of the power switch 37 connects the processor 56 to a source of power 57 thus turning on the remote unit 20. Also connected to the processor are the first and second activation buttons 44 and 46, respectively. The first activation button 44 causes the processor to generate a location request signal 24 to be transmitted to the GPS satellite 16 and the second activation button 46 causes the transmitter 56 to generate a request signal for transmission to the locator unit 22. The visual direction indicator 38, the visual altitude indicator 40 and the speaker 42 are also connected to and controlled by the processor 56. A transmitter 58 is connected to the processor 56 for transmitting location request signals to both the GPS satellite 16 and the locator unit 22. The transmitter is able to transmit at a plurality of frequencies including the frequency to which the GPS satellite 16 is tuned and the frequency at which the locator unit 22 is tuned. A receiver 60 able to receive signals transmitted at a plurality of frequencies is also connected to the processor 56. The receiver 60 is specifically tuned to receive signals transmitted by the GPS satellite 16 and the locator unit 22. The processor 56 is provided to control generation and transmission of the location request signal 24 to the GPS satellite upon activation of the first activation button 44 and generation and transmission of the request signal 32 to the locator unit 22 upon activation of the second activation button 46. Upon receipt of the response signal 26 from the GPS satellite 16 and the response signal 34 from the locator unit 22, the processor 56 analyzes the signals to determine the relative location of the locator unit 22 and thus the vehicle 13 in which it is installed. Based upon the-determined position of the locator unit 22, the processor 56 then controls the visual direction indicator 38, the visual altitude indicator 40 and the speaker 42 to direct the user 12 to the locator unit 22.

The locator unit 22 also includes a processor 62 for controlling operation thereof. The processor 62 is preferably connected to the vehicle power source 50. However, the processor 62 may be connected to any other power source provided. The processor 62 may also be connected to the ignition system 52 of the vehicle 13 to determine when the vehicle 13 has been turned off. A transmitter 64 is connected to the processor 62 for transmitting the location request signal 28 to the GPS satellite 16 and transmitting a location response signal 34 to the remote unit 20. A receiver 66 is connected to the processor 62 for receiving the location signal 30 from the GPS satellite 16 and receiving the location request signal 32 from the remote unit 20. The processor 62 is able to store the location signal 30 received from the GPS satellite 16 until requested by the remote unit 20. A sensor 68 may be provided to detect when the ignition system 52 has been turned off and thus control the processor 62 to generate the location request signal to be transmitted to the GPS satellite 16. A display 70 may also be provided connected to the processor 62 for displaying the determined latitude, longitude and altitude of the vehicle 13 thereon.

FIG. 6 is an enlarged perspective view of a laptop computer serving as the remote unit 20 having software designed to display the visual directional indicator 38, 40 on the display unit 74 of the wireless device 72. The software provides means for initiating an interrogation of the remote locator unit 22 using the keyboard 78 to launch the locator software. The remote unit 72 and locator unity 22 showing communication therebetween is illustrated in FIG. 6. This view shows the remote unit 72 and the locator unit 22 communicating via the location request signal 32 and the location response signal 34. Upon activation of a predetermined sequence using the keyboard 78, the remote unit 72 generates and transmits the location request signal 32. The locator unit 22 receives the location request signal 32 through a receiver antenna 54 and in response thereto generates the location response signal 34. The location response signal 34 is generated based upon a longitude, latitude and altitude signal received from the GPS satellite 16. The location response signal 34 is transmitted back to the remote unit 72 whereupon the software display the visual directional indicator 38, 40 on the display unit 74. The remote unit 72 has GPS hardware to determine the location of the remote unit and compares the location response 72 received from the GPS satellite 16 to determine the relative position and distance of the vehicle 13 from the remote unit 72. Upon determining the position and distance of the vehicle 13 from the remote unit 72, the remote unit 72 illuminates the appropriate arrow of the visual direction indicator 38 to point in the direction of the vehicle from the current location of the remote unit 72 as well as the visual altitude indicator 40 to alert the user 12 as to the altitude of the vehicle 13. Should the remote unit 72 determine that the vehicle 13 is at a different altitude than the remote unit 72, the remote unit illuminates the visual altitude indicator 40 to indicate the difference in altitude. The color of illumination of the visual altitude indicator 40 is dependent upon whether the vehicle 13 is at a higher or lower altitude.

The vehicle locator having an assigned unique identity can be wirelessly queried using cellular radio systems, Doppler RF, RF Radio Waves, Radio Frequency Identification (RFID) and Satellite Radio to provide a vehicle locator system wherein the vehicle locator unit can respond with the locator unit Latitude, Longitude and altitude to an interrogation request from a remote unit.

The cellular radio systems can use Time Division Multiple Access (TDMA) and/or Code Division Multiple Access (CDMA) and/or Frequency Division Multiple Access (FDMA) to transmit its stored longitude, latitude and altitude information to a Wireless Service Provider (WSP).

FIG. 7 is an enlarged perspective view of a PDA 80 serving as the remote unit 20 having software designed to display the visual directional indicator 38, 40 on the display unit 74 of the wireless device 72. The software provides means for initiating an interrogation of the remote locator unit 22 using the keypad 82 to launch the locator software. The remote unit 80 and the locator unit 22 showing communication therebetween is illustrated in FIG. 7. This view shows the remote unit 80 and the locator unit 22 communicating via the location request signal 32 and the location response signal 34. Upon activation of a predetermined sequence using the keypad 82, the remote unit 80 generates and transmits the location request signal 32. The locator unit 22 receives the location request signal 32 through a receiver antenna 54 and in response thereto generates the location response signal 34. The location response signal 34 is generated based upon a longitude, latitude and altitude signal received from the GPS satellite 16. The location response signal 34 is transmitted back to the remote unit 80 whereupon the software display the visual directional indicator 38, 40 on the display unit 74. The remote unit 80 has GPS hardware to determine the location of the remote unit and compares the location response signal 34 with a position signal indicating the longitude, latitude and altitude of the remote unit ;80 received from the GPS satellite 16 to determine the relative position and distance of the vehicle 13 from the remote unit 80. Upon determining the position and distance of the vehicle 13 from the remote unit 80, the remote unit 80 illuminates the appropriate arrow of the visual direction indicator 38 to point in the direction of the vehicle from the current location of the remote unit 80 as well as the visual altitude indicator 40 to alert the user 12 as to the altitude of the vehicle 13. Should the remote unit 80 determine that the vehicle 13 is at a different altitude than the remote unit 80, the remote unit illuminates the visual altitude indicator 40 to indicate the difference in altitude. The color of illumination of the visual altitude indicator 40 is dependent upon whether the vehicle 13 is at a higher or lower altitude.

The vehicle locator unit assigned a unique identity can use the Advances Mobile Phone Service (AMPS-[US]) and/or, Nordic Mobile Telephone (NMT [Scandinavia]) and/or, Total Access Communications System (TACS [UK]) and/or Global System for Mobile Communications (GSM [Europe, Asia]) to be wirelessly queried using the aforementioned cellular radio systems using Time Division Multiple Access (TDMA) and/or Code Division Multiple Access (CDMA) and/or Frequency Division Multiple Access (FDMA) to transmit its stored longitude, latitude and altitude information to a Wireless Service Provider (WSP).

FIG. 8 is an enlarged perspective view of a cellular telephone serving as the remote unit 84 having hardware and software designed to display the visual directional indicator 38, 40 on the display unit 74 of the wireless device 72. The software provides means for initiating an interrogation of the remote locator unit 22 using the keypad 82 to launch the locator software. The remote unit 84 and locator unit 22 showing communication therebetween is illustrated in FIG. 8. This view shows the remote unit 84 and the locator unit 22 communicating via the location request signal 32 and the location response signal 34. Upon activation of a predetermined sequence using the keypad 82, the remote unit 84 generates and transmits the location request signal 32. The locator unit 22 receives the location request signal 32 through a receiver antenna 54 and in response thereto generates the location response signal 34. The location response signal 34 is generated based upon a longitude, latitude and altitude signal received from the GPS satellite 16. The location response signal 34 is transmitted back to the remote unit 84 whereupon the software/hardware displays the visual directional indicator 38,40 on the display unit 74. The remote unit 84 has GPS hardware to determine the location of the remote unit and compares the location response signal 34 with a position signal indicating the longitude, latitude and altitude of the remote unit 84 received from the GPS satellite 16 to determine the relative position and distance of the vehicle 13 from the remote unit 84. Upon determining the position and distance of the vehicle 13 from the remote unit 84, the remote unit 84 illuminates the appropriate arrow of the visual direction indicator 38 to point in the direction of the vehicle from the current location of the remote unit 84 as well as the visual altitude indicator 40 to alert the user 12 as to the altitude of the vehicle 13.

The vehicle locator system having a remote unit using radio frequency (500 KHz–300 GHz) initiate a communication with the vehicle locator unit to transmit the stored longitude, latitude and altitude information FIG. 9 is an enlarged perspective view of a watch serving as the remote unit 88 having electronics designed to display the visual directional indicator 38, 40 on the display unit 74 of the wireless device 72. The software provides means for initiating an interrogation of the remote locator unit 22 using the stems 80 to launch the locator software. The remote unit 88 and locator unit 22 showing communication therebetween is illustrated in FIG. 9. This view shows the remote unit 88 and the locator unit 22 communicating via the location request signal 32 and the location response signal 34. Upon activation of a predetermined sequence using the stems 88 80, the remote unit 88 generates and transmits the location request signal 32. The locator unit 22 receives the location request signal 32 through a receiver antenna 54 and in response thereto generates the location response signal 34. The location response signal 34 is generated based upon a longitude, latitude and altitude signal received from the GPS satellite 16. The location response signal 34 is transmitted back to the remote unit 88 whereupon the software display the visual directional indicator 38, 40 on the display unit 74. The remote unit 88 has GPS hardware to determine the location of the remote unit and compares the location response signal 34 with a position signal indicating the longitude, latitude and altitude of the remote unit 88 received from the GPS satellite 16 to determine the relative position and distance of the vehicle 13 from the remote unit 88. Upon determining the position and distance of the vehicle 13 from the remote unit 88, the remote unit 88 illuminates the appropriate arrow of the visual direction indicator 38 to point in the direction of the vehicle from the current location of the remote unit 88 as well as the visual altitude indicator 40 to alert the user 12 as to the altitude of the vehicle 13. Should the remote unit 88 determine that the vehicle 13 is at a different altitude than the remote unit 88, the remote unit illuminates the visual altitude indicator 40 to indicate the difference in altitude. The color of illumination of the visual altitude indicator 40 is dependent upon whether the vehicle 13 is at a higher or lower altitude.

FIG. 10 illustrates the various transmission mediums that can be used by the vehicle locator system. Either unit can use plain old telephone system (POTS), and/or cellular radio systems, and/or Doppler RF, and/or RF Radio Waves, and/or Radio Frequency Identification (RFID) and/or Satellite Radio to initiate the transmission of the stored vehicle locator unit latitude, longitude and altitude information. As well as using Radio Frequency Identification (RFID) or the Public Switched Telephone Network System (PSTN) or cellular radio systems using Time Division Multiple Access (TDMA) and/or Code Division Multiple Access (CDMA) and/or Frequency Division Multiple Access (FDMA) to initiate the transmission of the stored vehicle locator unit latitude, longitude and altitude information.

Additionally the vehicle locator system can use the Advances Mobile Phone Service (AMPS-[US]) and/or, Nordic Mobile Telephone (NMT [Scandinavia]) and/or, Total Access Communications System (TACS [UK]) and/or Global System for Mobile Communications (GSM [Europe, Asia]) to initiate the transmission through a Wireless Service Provider (WSP) of the stored vehicle locator unit latitude, longitude and altitude information.

FIG. 11 illustrates a number of various wireless communication device: laptop computer 76, GPS watch 86, cellular telephone 84, PDA 80 and key chain 20 that can be used to initiate and receive the stored GPS data from the locator unit.

FIG. 12 is an illustration depicting the vehicle locator unit having a locator unit using a plurality of transmission mediums whereby a number of wireless remote devices can view the direction and altitude of a vehicle having the locator unit therein.

The operation of the vehicle locator system 10 will now be described with reference to the figures. In operation, the vehicle locator system 10 is installed by connecting the locator unit 22 in a desired vehicle 13. The locator unit 22 is preferably connected to the vehicle battery 50 and also to the ignition system 52 of the vehicle 13. Once the locator unit 22 is installed, the vehicle locator system 10 is ready for use.

Upon use, the user 12 will drive the vehicle 13 as conventionally done and park the vehicle 13 in a lot 14 when a desired destination is reached. Upon parking the vehicle 13, the locator unit 22 will sense when the vehicle is turned off via the sensor 68 connected to the ignition system 52. Upon sensing the vehicle 13 has been turned off and thus parked, the processor 62 will control the transmitter 64 to transmit the location request signal to the GPS satellite 16. The GPS satellite 16 determines the location in longitude, latitude and altitude of the locator unit 22 and transmits the location signal 30 indicative of the longitude, latitude and altitude of the locator unit 22 back to the locator unit 22. The locator unit 22 receives this signal 30 via the receiver 66 and the processor 62 stores the signal until requested by the remote unit 20.

When the user 12 completes the desired tasks and is returning to the vehicle 13, the location of the vehicle may have been forgotten. At this time the user 12 will activate the remote unit 20 by pressing the first activation button 44. Pressing of the first activation button causes the processor 56 to generate the location request signal 24 to be transmitted to the GPS satellite 16 via the transmitter 58. The GPS satellite 16 determines the location in longitude, latitude and altitude of the remote unit 20 and transmits the location signal 26 indicative of the longitude, latitude and altitude of the remote unit 20 back to the remote unit 20. The remote unit 20 receives this signal via the receiver 60 and provides the signal to the processor 56 for analysis. The user 12 then activates the second activation button 46 controlling the processor 56 to generate the location request signal 32 and transmit the location request signal 32 to the locator unit 22 via the transmitter 58. The locator unit 22 receives this signal 32 via the receiver 66 and retrieves the location signal 28 from the processor 62. The processor 62 then transmits a response signal 34 to the remote unit 20 via the transmitter 64. The response signal 34 is received by the receiver 60 and provided to the processor 56 for analysis.

The processor 56, upon receipt of the response signal 34, compares the response signal 34 to the location signal 26 received from the GPS satellite 16. Based upon this comparison, the processor 56 determines the relative direction and distance of the locator unit 22 from the remote unit 20. Upon determining the relative location of the locator unit 22, the processor 56 controls the visual direction indicator 38, the visual altitude indicator 40 and the speaker 42 to direct the user 12 towards the vehicle. The visual direction indicator 38 will illuminate an arrow pointing in the direction of the vehicle 13. The visual altitude indicator 40 will illuminate if the vehicle 13 is located at a different altitude than the remote unit 20 such as when the vehicle is parked in a multilevel parking facility. The speaker 42 is controlled to generate an audible signal, the signal changing as the remote unit approaches the location of the locator unit 22.

The remote unit 20 will continually transmit a location request signal to the GPS satellite to continually update its location signal for comparison with the location of the vehicle 13. The remote unit 20 will also continually transmit a location request signal 32 to the locator unit 22 for updating the location of the locator unit 22. The locator unit 22 will continually transmit a location request signal 28 to the GPS satellite 16 to continually update its location. Should the sensor 68 determine that the ignition of the vehicle 13 has not been activated, the location unit 22 need not continually transmit the location request signal to the GPS satellite 16, instead continually transmitting the stored location signal to the remote unit 20. The processor 56 will continually analyze the location signals of the locator unit and remote unit and control the visual direction indicator 38, the visual altitude indicator 40 and the speaker 42 to update the relative position of the locator unit 22 and vehicle 13 with respect to the remote unit 20. Upon finding the vehicle 13, the user 12 can activate either of the first or second activation buttons 44 and 46 to cease monitoring of the locations. Alternatively, the user 12 can activate the power switch 37 to turn the remote unit off.

From the above description it can be seen that the vehicle locator system of the present invention is able to overcome the shortcomings of prior art devices by providing a vehicle locator system which is able to alert a user as to the location of a vehicle by providing a direction and relative altitude of the vehicle. The vehicle locator system utilizes the Global Positioning Satellite System to obtain a location for the vehicle which, when compared to the location of the user holding a remote unit, provides a direction of travel for locating the vehicle. The vehicle locator system includes a transmitter installed within a desired vehicle, the locator unit including a receiver able to communicate with the Global Positioning Satellite System to determine a location for the vehicle. The vehicle locator system also includes a remote unit able to utilize the Global Positioning Satellite System to determine a location therefor and communicate with the locator unit in the vehicle to determine a position for the vehicle relative to the remote unit. The remote unit includes a plurality of indicator lights for indicating a direction in which the vehicle can be found, an indicator light for indicating an altitude level relative to the altitude of the remote unit at which the vehicle can be found such as when the vehicle is located on a different story of a parking lot from the user and a speaker to provide an audible signal indicating the proximity of the remote unit from the locator unit. Furthermore, the vehicle locator system of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying knowledge, readily adapt it for various applications without omitting features, that, from the standpoint of prior art, fairly constitute characteristics of the generic or specific aspects of this invention.

What is claimed is:

1. A system for locating an object using the Global Positioning Satellite System (GPS), the locating system comprising:

a locator unit connected to the object;

the locator unit including a first processor, a first transmitter for transmitting a position request signal to the GPS, and a first receiver for receiving a first position signal from the GPS indicative of the position of the object and providing the first position signal to the first processor for storage;

a hand-held remote unit selected from the group laptop computer, GPS watch, cellular telephone and PDA for determining a position of the remote unit relative to the object;

the remote unit including a second processor, a second transmitter for transmitting a position request signal to the GPS, a second receiver for receiving a second position signal from the GPS indicative of the position of the remote unit and providing the second position signal to the second processor for storage;

means connected to the second processor for generating a request signal requesting the first location signal from the locator unit, whereupon the locator unit retrieves the first location signal from the first processor and transmits the first location signal to the remote unit, such that upon receipt of the first location signal the second processor compares the first location signal to the second position signal and determines a position of the remote unit relative to the object; and display means connected to the second processor for displaying a visual signal and issuing an audio signal to indicate the position of the remote unit relative to the object, the display means including an indicator having directional arrows showing a direction from the remote unit, and an area on the display indicating by color the relative altitudes of the remote unit and the object.

2. The object locating system as recited in claim 1, wherein the object is a vehicle and the first processor is connected to an ignition system of the vehicle, the first processor controlling the first transmitter to transmit the position request signal automatically upon detecting that the ignition system has been turned off.

3. The object locating system as recited in claim 1, wherein altitude is indicated by an LED that is illuminated in a first color when the second processor determines that the remote unit is at a higher altitude than the object and is illuminated in a second color when the second processor determines that the remote unit is at a lower altitude than the object.

4. The object locating system as recited in claim 3, wherein the LED remains unilluminated when the second processor determines that the remote unit is at a same altitude as the object.

5. The object locating system as recited in claim 1, wherein the remote unit transmits the request signal at predetermined intervals to the locator unit for updating the position of the object with respect to the remote unit.

6. The object locating system as recited in claim 1 wherein transmission mediums used in the locating system are selected from the group RF radio waves, Doppler RF, microburst access system, Satellite radio, CDPD, GSM, TDMA, CDMA, AMPS, RFID and MOAERIS.

7. A method of locating a vehicle in an area that is crowded with vehicles, comprising the steps of:

providing a locator unit;

mounting the locator unit on a vehicle;

providing a first GPS device in the locator unit to obtain vehicle-location-information;

programming the first GPS device to be activated upon a user parking the vehicle and turning off the vehicle, whereupon the locator unit stores vehicle-location-information including latitude, longitude, and altitude of the vehicle as obtained by the first GPS device;

providing a hand-held remote unit to be carried by the user, the remote unit being selected from the group laptop computer, GPS watch, cellular telephone and PDA;

providing a second GPS device in the remote unit to obtain user-location-information;

providing a first button on the remote unit to activate the second GPS device to obtain and store user-location-information including latitude, longitude and altitude of the user;

providing a second button on the remote unit that is operable to obtain latitude, longitude and altitude vehicle-location-information that is stored in the locator unit;

providing that upon the user parking and leaving the vehicle in the area, and thereafter returning to the area, the user may push the first button to obtain user-location-information, and may push the second button to obtain vehicle-location-information;

providing that the remote unit compares the user-location information to the vehicle-location-information and displays a direction for the user to move in order to approach the vehicle, that the remote unit displays any difference in altitude between the user and the vehicle, and that the remote unit issues an audible signal indicating a distance between the user and the vehicle.

8. The method of claim 7 including the step of:

providing that transmission mediums used in the method are selected from the group RF radio waves, Doppler RF, microburst access system, Satellite radio, CDPD, GSM, TDMA, CDMA, AMPS, RFID and MOAERIS.

* * * * *